Figure 1:
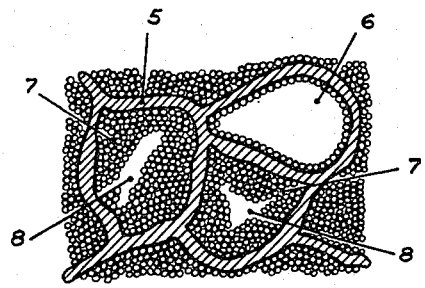

INVENTOR
HANS VOGT

Patented Feb. 3, 1953

2,627,531

UNITED STATES PATENT OFFICE 2,627,531

POROUS ELECTRODE

Hans Vogt, Malarhojden, near Stockholm, Sweden

Application December 8, 1948, Serial No. 64,197
In Sweden December 15, 1947

8 Claims. (Cl. 136—20)

It has been proposed to make electrodes for electric accumulators from highly porous sintered plates impregnated with metal hydroxides. While electrodes of such construction have a low internal resistance, they exhibit an unfavorable ratio of capacity to weight. This is largely due to the requirement that the electrodes should combine high mechanical strength with a large internal pore surface which is difficult to achieve. Additionally, it is difficult to introduce the electro-chemically active substance into the pores of electrodes of the type referred to and to render said pores readily accessible for the electrolyte.

It is an object of the present invention to provide an electrode that combines high mechanical strength with large pore surface.

Another object of the invention is to provide an improved electrode, of the type referred to, into whose pores the electro-chemically active substance may be readily introduced.

Still another object of the invention is to provide an improved electrode, of the type referred to, whose pores are readily accessible for the electrolyte.

The electrode of my invention comprises a cavernous supporting structure and a fine-pored sinter mass imbedded within the cavities of said supporting structure, with the electro-chemically active substance contained within the pores of said sinter mass.

The superior characteristics of the electrode of my invention are due to the fact that the problem of providing high porosity combined with high mechanical strength is solved by the employment of two separate structures, namely, a large-pored cavernous body that imparts sturdiness to the electrode and a fine-pored sinter mass imbedded within the cavities of said large-pored body. This fine-pored sinter mass can be made to provide a maximum of internal surface unequaled in prior known electrodes since it may be constructed without regard to considerations of mechanical strength.

The two structures from which the electrode of my invention is composed may be produced by methods that are in themselves well known in the art. Thus, ceramic manufacturing methods may be employed to construct the body from carbon, metal or metal oxides by sintering suitable powder mixtures at relatively high temperatures. Said powder mixtures may contain ingredients that can be removed from the resultant structure by oxidation, evaporation, dissolution and like methods to render the structure porous. Other methods of producing the supporting body will hereinafter be described in greater detail.

The fine-pored sintered mass may be produced by impregnating the cavernous supporting body with metal salts, which are converted into metal oxides by a heat treatment and said metal oxides in turn are reduced to metal sponge. Alternatively, the cavities of the supporting body may be filled with emulsions of metal or metal oxide powder, finely divided carbon or the like, whereupon the body is subjected to a lower temperature heat treatment, the object being in all instances to establish a slight mechanical and hence electrically conductive coherence not only amongst the particles that form the sinter mass but also between said particles and the walls of the supporting body. In cases where said body consists of ceramic material, such as aluminum oxide, silicone oxide, glass or the like, its inner surface should be provided with a thin metal coating. This may readily be accomplished by impregnating said body with a metal salt and subjecting it to temperatures effective to form a coherent metal coating on the surfaces thereof.

Figure 2:
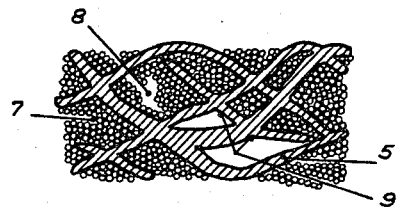

The invention will now be explained in greater detail with the aid of the accompanying drawing which illustrates certain preferred embodiments thereof and wherein:

Figure 1 shows a magnified fragmentary cross section through an electrode constructed in accordance with the invention and, Figure 2 shows a magnified fragmentary section similar to Figure 1 through a modified embodiment of the invention.

Having reference to both said figures, the supporting body 5 forms relatively large pores of cavities 6 that are filled with a fine-pored sinter mass 7. Said sinter mass 7 is preferably arranged to form central channels 8 which facilitate access of the electrolyte and hence of the ions to the hydroxide contained in the fine pores of the sinter mass 7. Channels of this type can be established by shrinking the substance that is introduced into the supporting body to form the fine-pored sinter mass. This may be accomplished by a suitable heat treatment.

The supporting body 5 illustrated in Figure 1 is of rigid construction while that of Figure 2 is made of fine elastic threads or fibers, such as metal wool or glass wool, and these threads or fibers are soldered or sintered together at their points of contact 9. This may be accomplished by impregnating the body with a metal salt solution and subjecting it to temperatures between 800° and 1000° C. in a reducing atmosphere to effect precipitation of the metal. In this manner a coherent body is formed that possesses a certain degree of elasticity and which is of extremely high porosity. As a matter of fact, it is possible by the described method to produce a sturdy supporting structure with a pore volume of up to 95% of its total volume. Such a structure is extraordinarily suited as carrier for the fine-pored sinter mass and the electro-chemically active substance.

The above described electrodes are preferably made in the form of plates or strips. However, they may also be made in the form of tubes or small balls. The cheapest and easiest way to make them is to mold a random mass of thread or fiber material into the desired shape. In certain instances, however, it may be preferable to produce bodies of a uniform porosity which may be accomplished by arranging the threads in the form of spools or wire nets which may be placed upon each other to form plates or which may be rolled into tubes.

The electrodes of the invention may be produced in various ways as demonstrated by the following examples:

*Example 1.*—Particles of about $\frac{1}{100}$ mm. in diameter screened out from mechanically comminuted iron oxide ($Fe_3O_4$) are mixed with 10% by weight of particles of charcoal, cellulose fiber or the like, of about equal size. The mixture is then compressed and sintered for several hours in a reducing atmosphere at temperatures of from 1000° C. to 1100° C. Upon cooling the resultant body may be provided with a nickel coating, if required. Thereupon its pores are filled with a salt of the metal intended to form the fine-pored mass. This salt is converted into metal sponge in a reducing atmosphere at temperatures of about 350° C. to 450° C. with the result that said sponge practically fills the pores of the supporting body. Thereupon the whole electrode is repeatedly impregnated with the metal salt which is to form the electro-chemically active hydroxide, for instance, a solution of nickel salt or cadmium salt. This may be accomplished by filling the pores in a known manner with the solution, drying the electrode body, precipitating the hydroxide from the salt by means of an alkali and rinsing the electrode body. An electrode of this type is especially suited to serve as a cathode.

*Example 2.*—Steel or nickel wool is made into a coherent porous body, such as woven strips, twisted tapes or flat strings. These are moistened with a metal salt solution and thereafter subjected to a sintering process in a reducing atmosphere at temperatures of from 800° C. to 1000° C. The resultant structure is light and large-pored yet possesses good mechanical coherency. Now a thick emulsion is prepared from powdered metal or metal oxide and a suitable liquid, such as water or weak acids. The pores of the large-pored body are filled with said emulsion which may be accomplished by a dipping process. The impregnated body is then dried, subjected to a sintering process in a reducing atmosphere at temperatures of about 400° C. and thereafter impregnated with hydroxide-producing metal salts in the usual manner. If necessary the dipping, drying and even the sintering processes may be repeated several times.

*Example 3.*—The pores of an electrode body made according to the methods employed in the artificial carbon art are filled with an emulsion of a suitable liquid and carbon powder, such as soot. A hydro-carbon, such as petrol, benzene or acetone mixed with tar or pitch may also be used. The volatile solvent is then distilled and the electrode body is dried, whereupon the carbon particles in its pores are slightly sintered in an oxygen-free atmosphere at temperatures of about 800° C. to 1000° C. The electrode is then cooled and impregnated with a metal hydroxide in the usual manner. To improve the conductivity of the carbon structure, its pore surface may be provided with a suitable coating prior to said impregnation process. This can be accomplished by a galvanic process or according to the methods employed in the powder ceramic art. An electrode produced in this manner is well suited as a cathode.

*Example 4.*—A porous body of vitreous material, such as filter stone or glass filter, is impregnated with a nickel salt solution in a vacuum and then subjected to a temperature of 700° C. in a reducing atmosphere. In this manner an electrically conductive metal coating is formed over the total surface of the body. The body is then repeatedly immersed into a warm solution of nickel nitrate and thereafter heated to a temperature of about 350° C. to drive off the acid component of the salt. As a result thereof, very fine particles of nickel oxide ($Ni_2O_3$) are formed in the pores of the body. The described process is repeated several times until the large pores of the body are filled. Then the body is subjected to a reducing process at 350° C. to 450° C. to convert the nickel oxide into nickel sponge. This latter treatment is followed by the previously described impregnation methods which fill the body with hydroxide of nickel, cadmium or iron.

The electrodes of my invention are especially suited for alkaline accumulators for use as starting batteries in automobiles or electrically driven vehicles.

What I claim is:

1. An electrode for accumulators containing an electro-chemically active substance and having a body comprised of two intertwined yet distinct porous masses of a distinctly different order of pore size, said larger-pored mass being of irregular conformation and said smaller-pored mass being a sinter mass of substantially uniform porosity, with said electro-chemically active substance contained within the pores of said smaller-pored mass.

2. An electrode according to claim 1, wherein said smaller-pored mass is arranged to form central channels.

3. An electrode for accumulators containing an electro-chemically active substance and having a body comprised of a cavernous metal structure and a fine-pored sinter mass embedded within the cavities of said structure, said electro-chemically active substance being contained within the pores of said sinter mass.

4. An electrode for accumulators containing an electro-chemically active substance and having a body comprised of a plurality of interconnected fibres arranged to form a cavernous supporting structure and an electrically conductive fine-pored sinter mass embedded within the interstices of said fibre structure, said electro-chemically active mass being contained within the pores of said fine-pored sinter mass.

5. An electrode for accumulators containing an electro-chemically active substance and having a body comprised of a plurality of conductively interconnected metallic fibres arranged to form a cavernous supporting structure and an electrically conductive fine-pored sinter mass embedded within the interstices of said fibre structure, said electro-chemically active mass being contained within the pores of said fine-pored sinter mass.

6. An electrode for accumulators containing an electro-chemically active substance and having a body comprised of a large-pored supporting structure formed from particles of glass, ceramic material and the like, and an electrically conductive fine-pored sinter mass embedded within the pores of said structure, said electro-chemically active substance being contained within the pores of said fine-pored sinter mass.

7. An electrode for accumulators containing an electro-chemically active substance and having a body comprised of a plurality of conductively interconnected metal coated fibres of glass, ceramic material and the like, arranged to form a cavernous supporting structure and an electrically conductive fine-pored sinter mass embedded within the interstices of said fibre structure, said electro-chemically active substance being contained within the pores of said fine-pored sinter mass.

8. An electrode for accumulators containing an electro-chemically active substance and having a body comprised of a cavernous carbon structure and an electrically conductive fine-pored sinter mass embedded within the interstices of said carbon structure, said electro-chemically active substance being contained within the pores of said fine-pored sinter mass.

HANS VOGT.

REFERENCES CITED

The following references are of record in the file of this patent:

UNITED STATES PATENTS

| Number | Name | Date |
| --- | --- | --- |
| 854,200 | Edison | May 21, 1907 |
| 882,144 | Edison | Mar. 17, 1908 |
| 884,930 | Jungner | Apr. 14, 1908 |
| 1,885,451 | Kraenzlein | Nov. 1, 1932 |
| 1,940,385 | Ackermann | Dec. 19, 1933 |
| 1,942,791 | Ackermann | Jan. 9, 1934 |
| 1,988,861 | Thorausch | Jan. 22, 1935 |
| 2,304,073 | Brennan | Dec. 8, 1942 |
| 2,361,378 | Brennan | Oct. 31, 1944 |

FOREIGN PATENTS

| Number | Country | Date |
| --- | --- | --- |
| 422,353 | Great Britain | Jan. 10, 1935 |